A. M. BELLONY.
PILE DRIVING MACHINE.
APPLICATION FILED APR. 26, 1919.
1,395,895.
Patented Nov. 1, 1921.
9 SHEETS—SHEET 2.
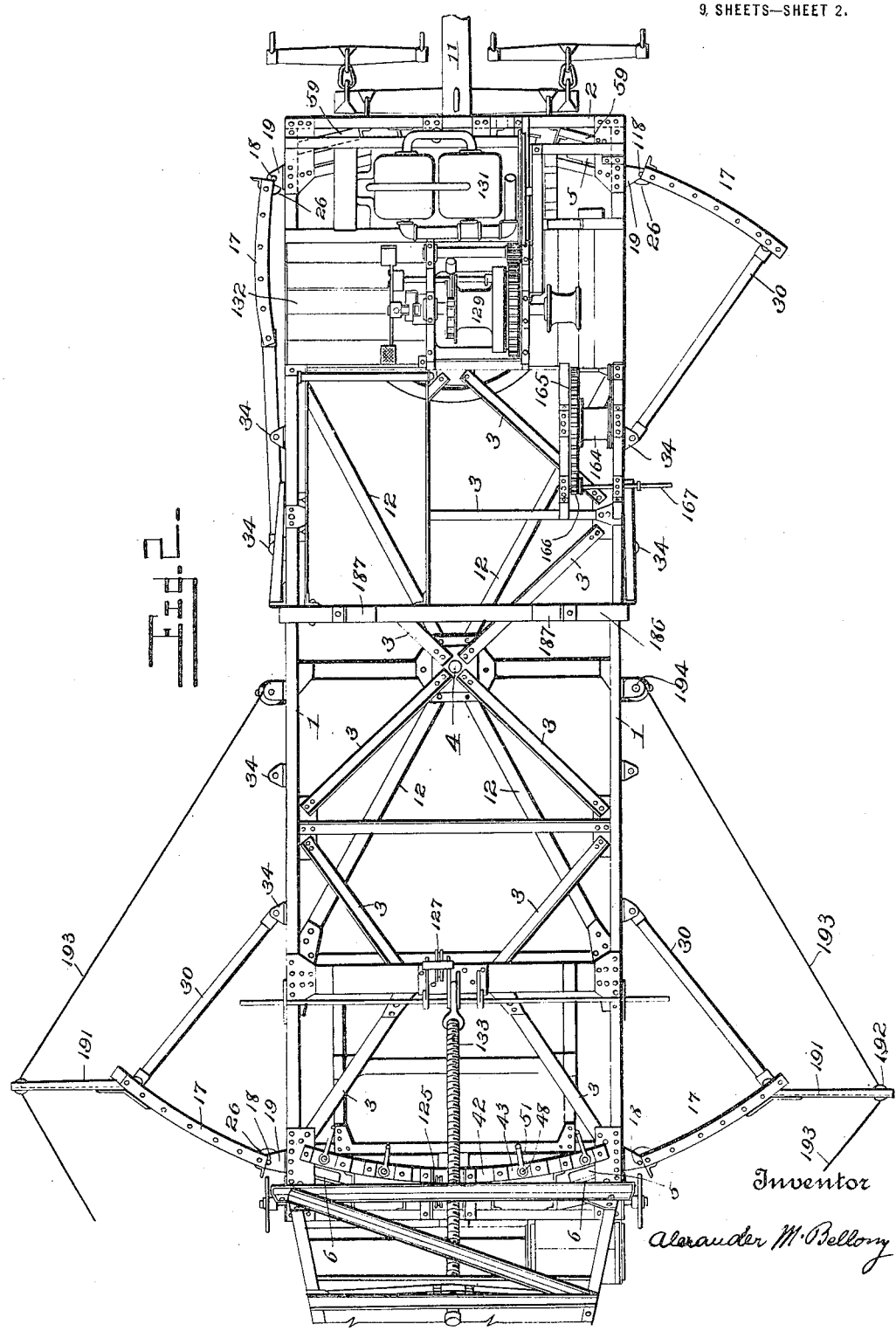
Inventor
Alexander M. Bellony

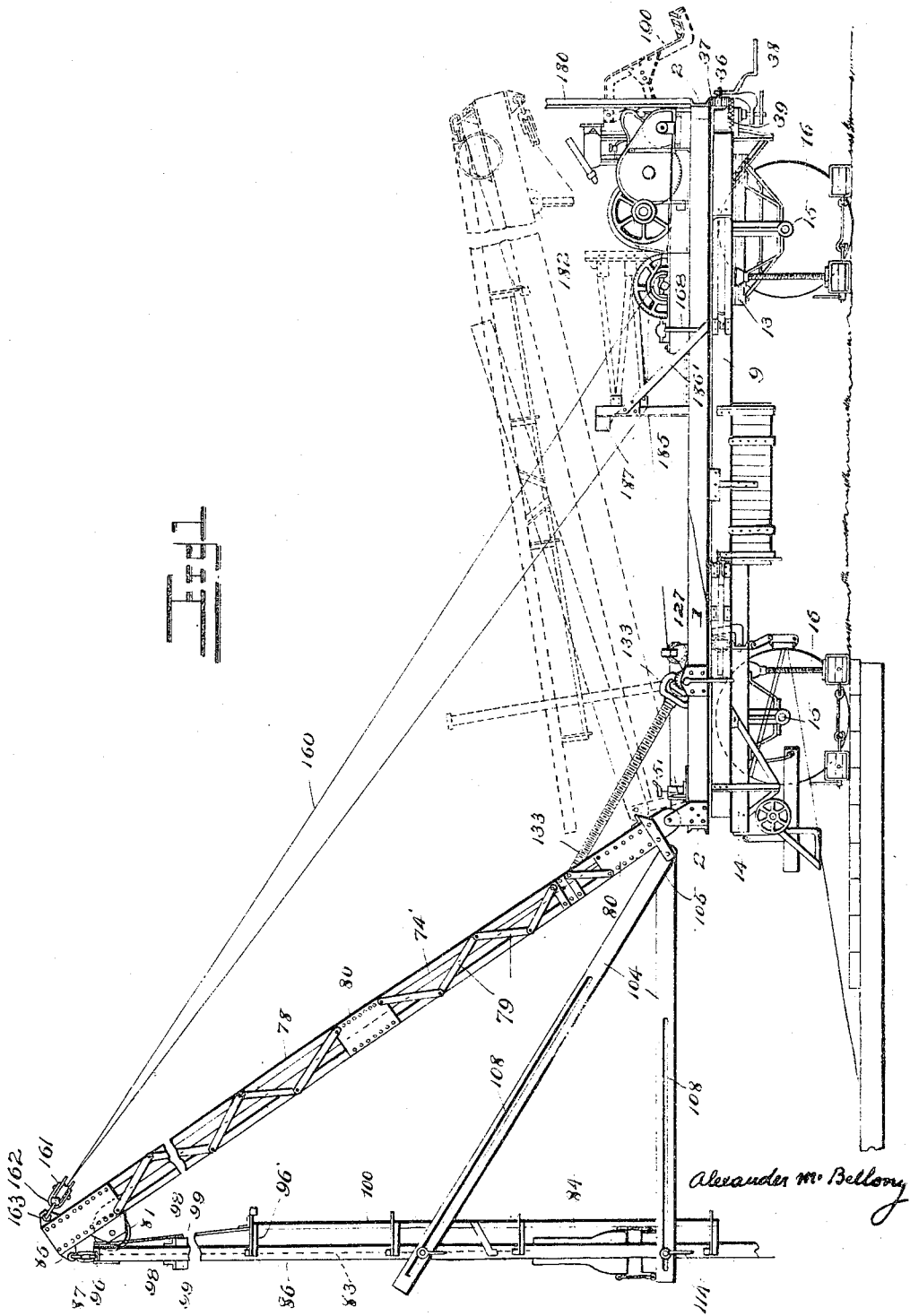

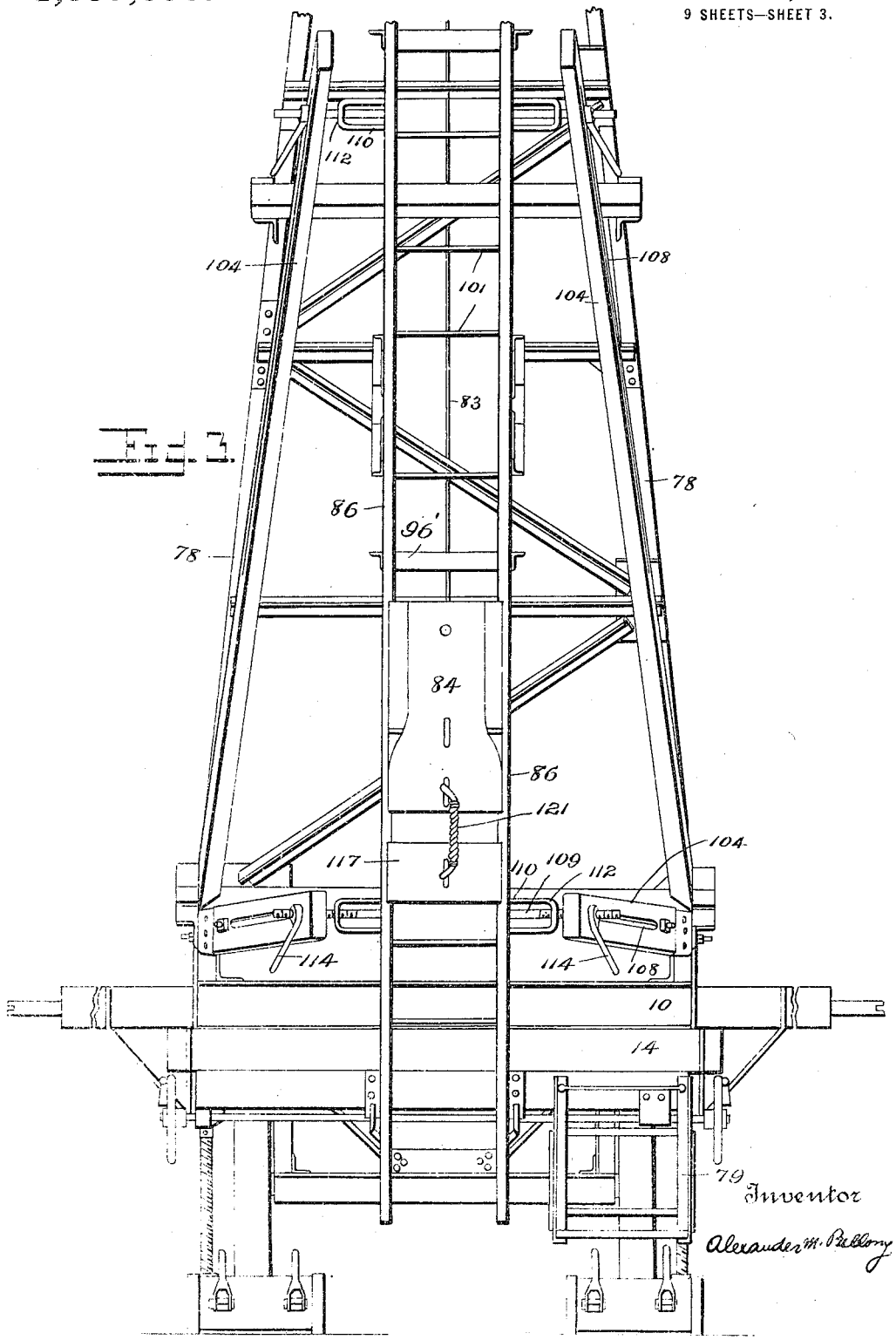

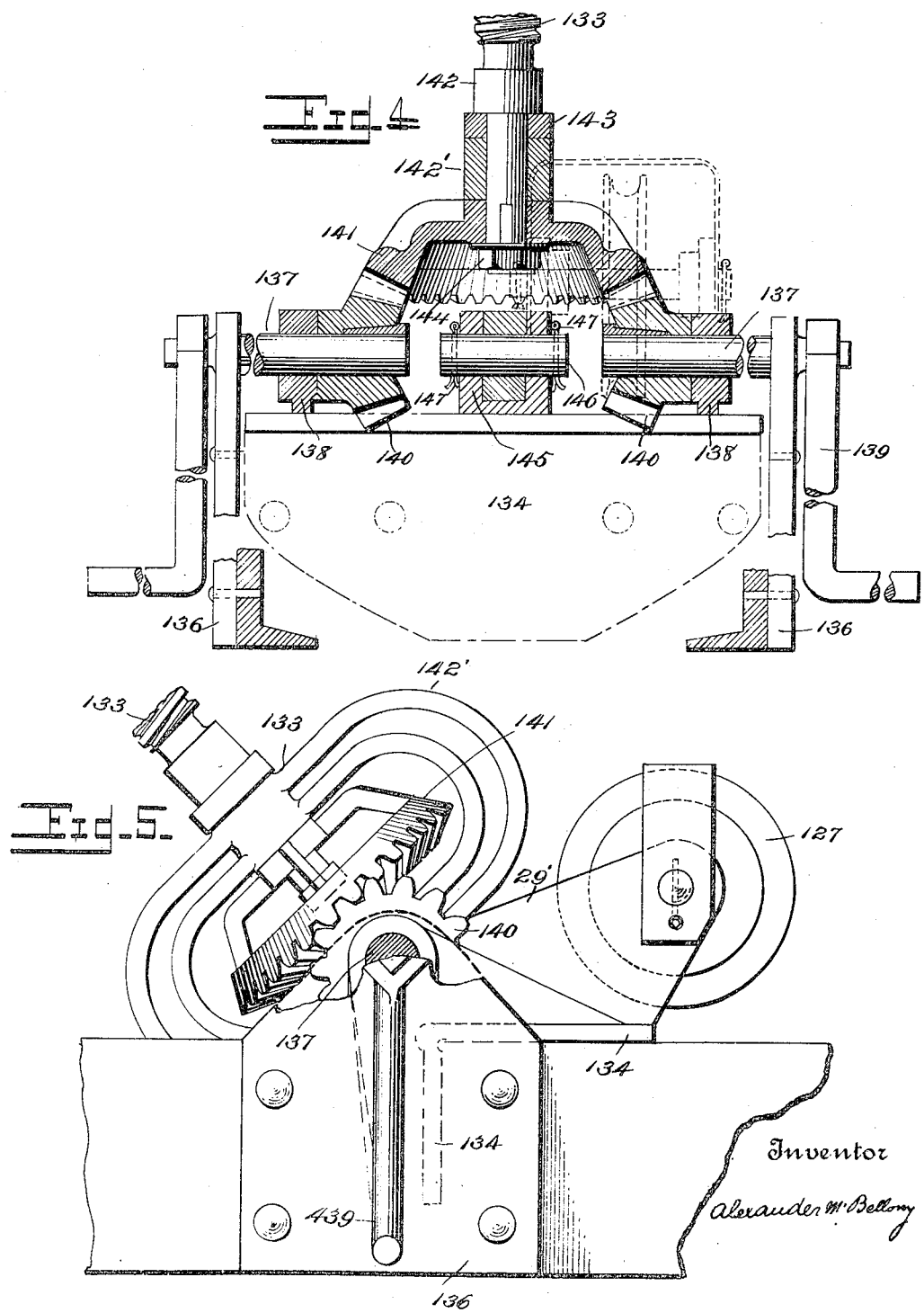

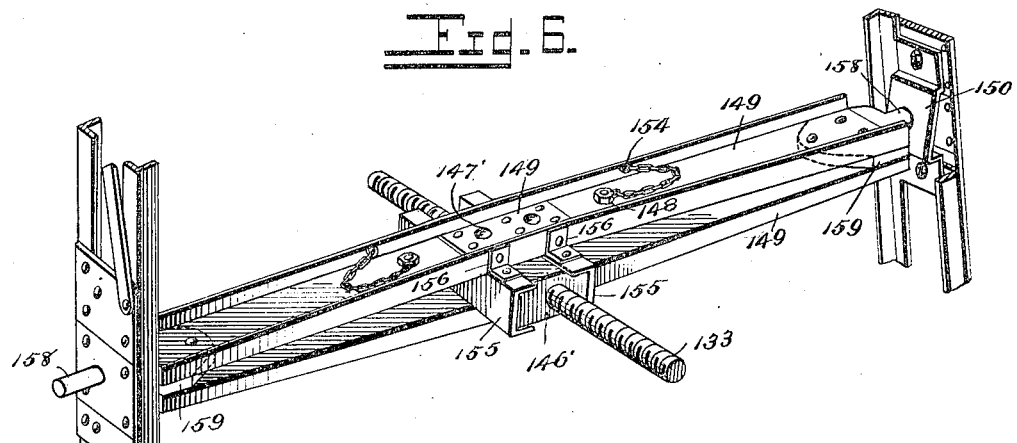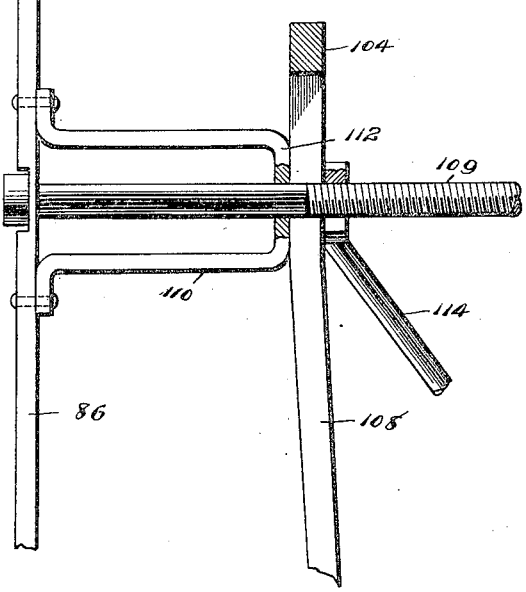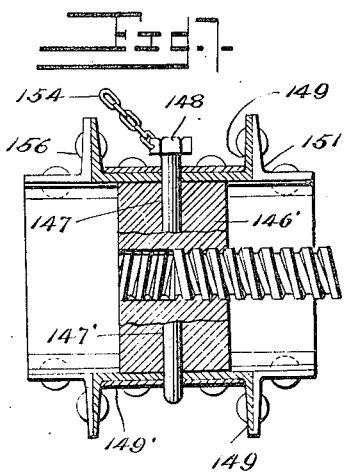

A. M. BELLONY.
PILE DRIVING MACHINE.
APPLICATION FILED APR. 26, 1919.
1,395,895.
Patented Nov. 1, 1921.
9 SHEETS—SHEET 6.
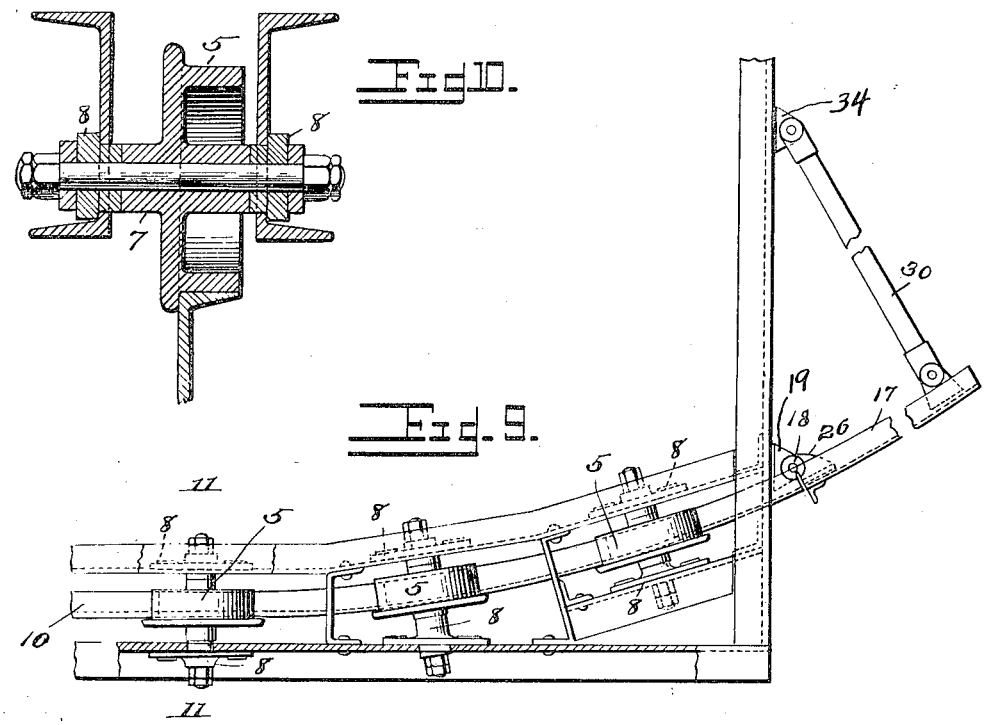
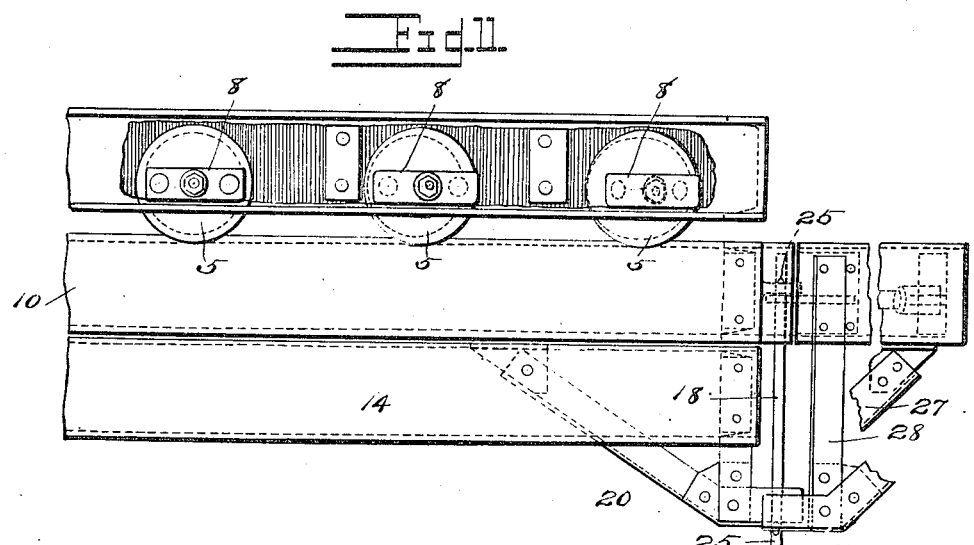

A. M. BELLONY.
PILE DRIVING MACHINE.
APPLICATION FILED APR. 26, 1919.
1,395,895.
Patented Nov. 1, 1921.
9 SHEETS—SHEET 7.
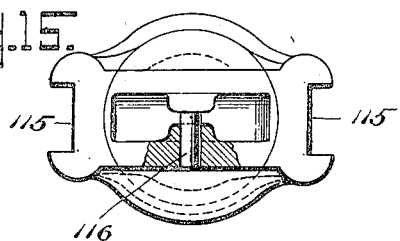
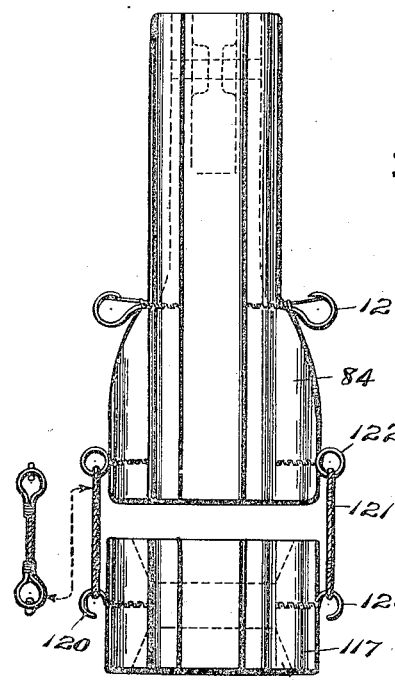
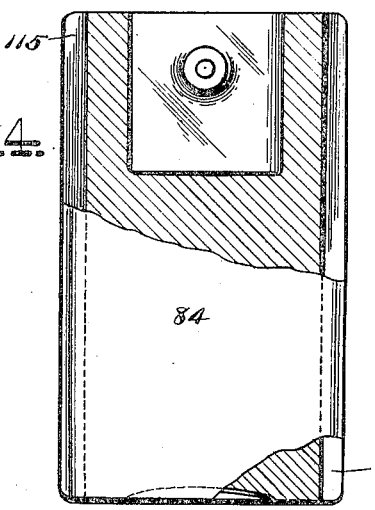
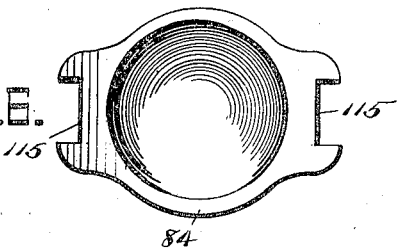
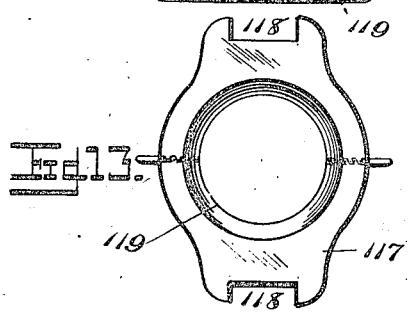
Inventor:
Alexander M. Bellony A. M. BELLONY.
PILE DRIVING MACHINE.
APPLICATION FILED APR. 26, 1919.
1,395,895.
Patented Nov. 1, 1921.
9 SHEETS—SHEET 8.
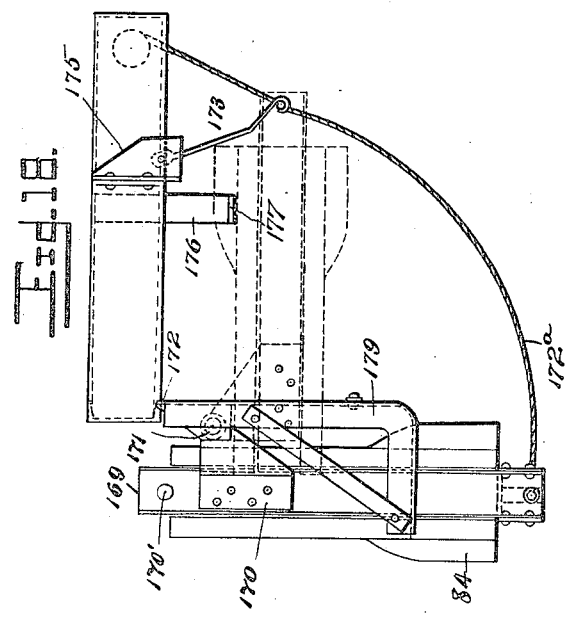
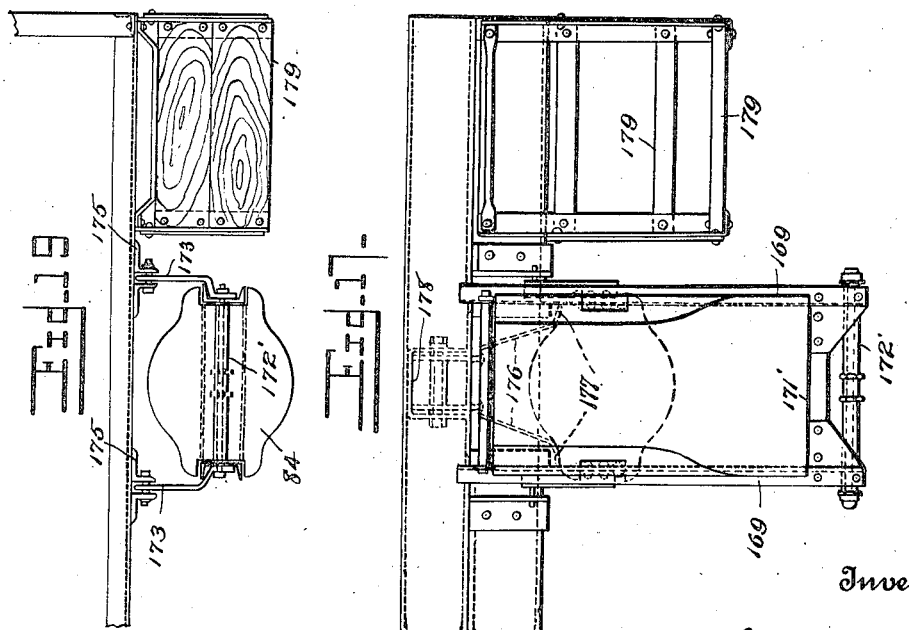
Inventor
Alexander M. Bellony

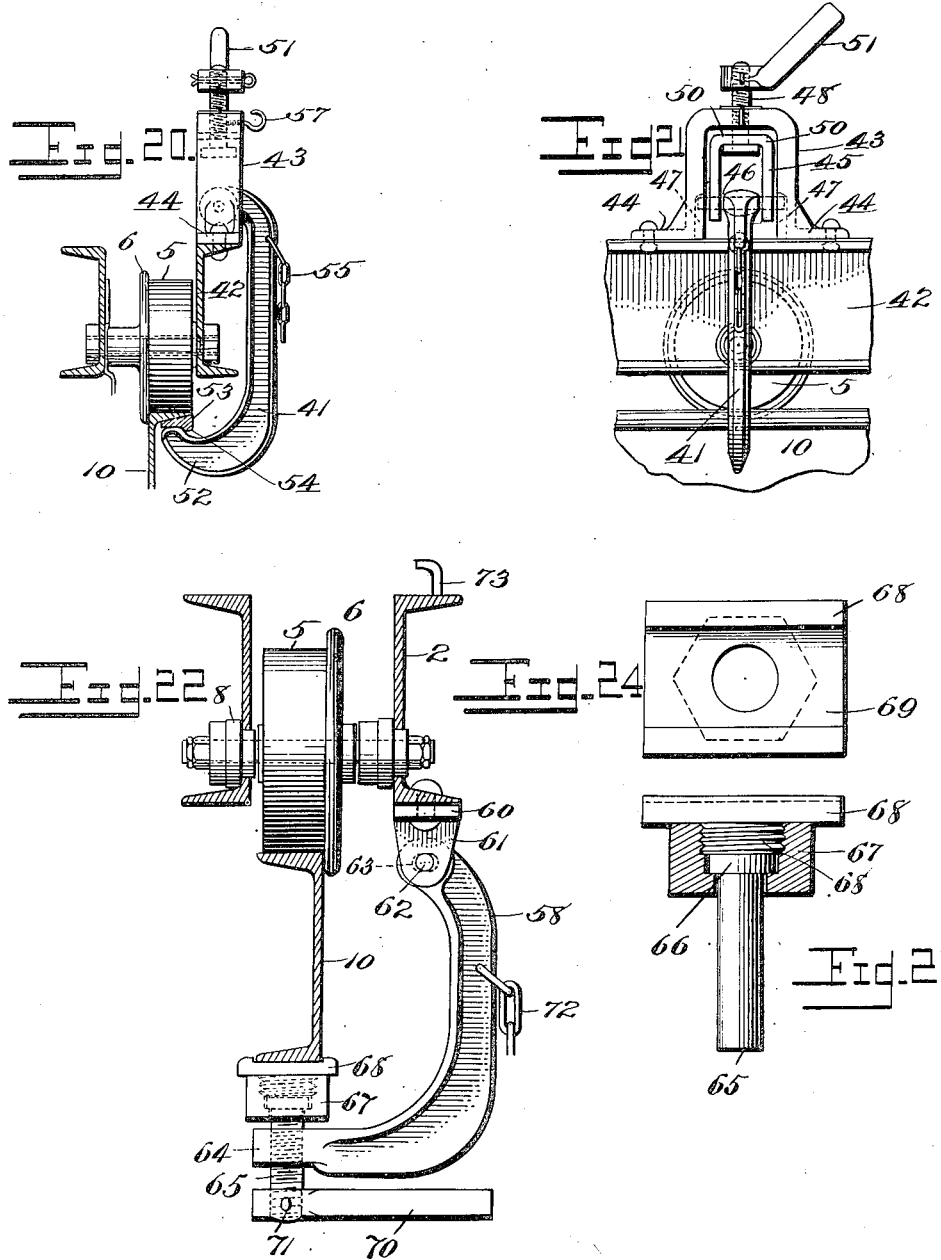

UNITED STATES PATENT OFFICE.

ALEXANDER M. BELLONY, OF THE UNITED STATES ARMY.

PILE-DRIVING MACHINE.

1,395,895. Specification of Letters Patent. Patented Nov. 1, 1921.

Application filed April 26, 1919. Serial No. 293,031.

(FILED UNDER THE ACT OF MARCH 3, 1883, 22 STAT. L., 625.)

*To all whom it may concern:*

Be it known that I, ALEXANDER M. BELLONY, Capt., Corps of Engineers, United States Army, a citizen of the United States, stationed at Washington, D. C., have invented an Improvement in Pile-Driving Machines, of which the following is a specification.

The invention described herein may be used by the Government, or any of its officers or employees in prosecution of work for the Government, or by any other person in the United States, without payment of any royalty thereon.

While my inventive improvements are exemplified in the drawings as embodied in a pile-driver, yet, by an obvious exchange of certain structural parts, the machine, as an entirety, is a derrick (or crane), a power shovel, or a trench-digger, as may be desired. And, by dismounting the frames from the trucks, said frames may be placed on floating barges and railroad trucks and the pile-driving mechanism be operated from such barges or railroad trucks, if so desired.

The embodiment of my invention herein illustrated and described comprises a pile driver of the drop hammer type, that is so arranged that the boom and the leads for the hammer may be adjusted both vertically and horizontally, whereby a large range on either side of the pile driver may be attained.

One object of my invention is so to support the leads for the hammer that they may be brought into proper operative position from folded position with great facility.

A further object of my invention is to provide a machine capable of being readily rigged up so as to operate interchangeably as a crane or a pile driver.

Another object of my invention is to arrange the boom in such folded position that the entire pile driver will occupy a minimum amount of space while it is not in use, but arranged so that the boom may be placed into operative position in a very few minutes.

Another object of my invention is to enable the upper frame to be swung to either side through a considerable arc, the upper frame rollers riding on extension, foldable tracks, carried by the lower frame.

Another object of my invention is to enable the upper frame to be held securely supported while it is being swung relatively to the lower frame so as to provide a strong and rigid structure.

Another object is to provide a support for the boom when it is folded and in the inoperative position, so arranged that it also serves for retaining a removable seat for the driver.

Another object of my invention is to prevent excessive lifting of the hammer, which might cause derangement of the apparatus, or even serious accident.

Other objects and advantages will become apparent as the description of my device proceeds.

The accompanying drawings, illustrating an embodiment of my invention, consist of the following views:

Figure 1 is a view, in side elevation, of my pile-driving machine;

Fig. 2 is a view in top plan thereof;

Fig. 3 is a view in front elevation thereof;

Fig. 4 is a sectional detail view of part of the mechanism for raising and lowering the boom;

Fig. 5 is a detail view, taken at right angles to Fig. 4, of a portion of said mechanism for raising and lowering the boom;

Fig. 6 is a detail view, in perspective, of the boom-elevating and lowering screw-block and screw and their connection with the boom;

Fig. 7 is a sectional detail view of the screw-block, showing, also, the guides in which it moves;

Fig. 8 is a fragmentary detail view of the connections between the sway braces and the boom;

Figs. 9 and 10 are fragmentary detail views, in top plan and in side elevation, respectively, of a portion of one of the main and extension tracks of the lower frame, and of a portion of the upper frame carrying the rollers;

Fig. 11 is a transverse section on the line 11—11, Fig. 9;

Fig. 12 is a view in side elevation of the hammer and follower;

Fig. 13 is a bottom plan view of the follower;

Figs. 14, 15, and 16 are detail views in front elevation (partly in section), top plan (partly in section) and bottom plan, respectively, of the hammer;

Figs. 17, 18 and 19 are detail views, in front elevation, side elevation, and bottom plan respectively, of the carriage for the hammer and of the brake-platform.

Figs. 20 and 21 are detailed views in side and front elevation, respectively, of the rear frame clamp; Fig. 22 is a detailed view and side elevation of the front frame clamp; Fig. 23 is a detailed view in elevation partly in section of the clamp screw and Fig. 24 is a plan view of the same.

Referring now more particularly to the drawings in which like reference numerals indicate corresponding parts:

The frame of the pile driver consists of a movable upper frame and a stationary lower frame. The upper frame may be advantageously constructed from channel irons forming a substantially rectangular box-like structure, in which 1, 1 are the sides and 2, 2 the ends. The flanges of the channel irons are desirably turned inward on the two longitudinal sides 1, 1, but are preferably turned outward on the ends 2, 2, for a purpose later to be described. The upper frame may be appropriately firmly braced by suitable connections, such as angle irons, plates, and channels, in a conventional manner, as indicated at 3. Preferably, at the exact center of the upper frame, a pivot pin 4 is provided constituting the axis of the rotatable upper frame.

The frame is provided, both at its front and rear ends, with supporting rollers or wheels 5. Preferably, ten rollers are used, five at the front end and five at the rear end. These rollers are each provided with a flange 6, and are mounted on shafts 7 supported, at their ends, in suitable bearings 8. The five rollers, at each end of the frame, are arranged in the arc of a circle struck from the axis of pivot 4 as a center, and if the axes 7 of the rollers were extended, they would pass through the axis of pivot 4. The bearings 8 are securely bolted to the upper frame, and are so arranged relatively to the upper frame that the rollers extend somewhat below the lower edge thereof, and roll on tracks carried by the lower frame as hereinafter described.

The lower frame may be a substantially rectangular structure, of channel-irons, including the sides 9, 9, and the longitudinally-curved front and rear ends 10, 10, constituting front and rear tracks, on which rolls the rollers or wheels 5 of the upper frame, the flange 6 of such wheels bearing against the outer vertical surface of said tracks. Both tracks 10, 10 have their flanges turned inward, and are formed in arcs of a circle struck from the axis of pivot pin 4, as a center. The bracing and stiffening of the frame may be of the conventional type, as indicated at 12.

The entire lower frame is supported by a front truck 13 and by a rear truck 14. These trucks carry the axles 15 on which are mounted wheels 16. The trucks are not described in detail herein, as they form the subject-matter of co-pending applications, filed May 7, 1919, April 26, 1919, and April 26, 1919, and serially numbered 295,467, 293,028, and 293,029.

The front truck 13 carries a tongue 11. It is to be understood, however, that while the pile-driver is shown as being adapted to be pulled by draft-animals, any means whatsoever (such as a motor) may be utilized therefor, it being immaterial, as far as the present invention is concerned, just what means are employed.

To permit of an increased rotational movement of the upper frame relatively to the lower frame, about the pivot pin 4, track extensions 17 are carried by the lower frame. These track extensions are formed of channel-iron and are four in number, two on each side of the pile driver. Each track extension is hinged for pivotal movement on a hinge pin 18 suitably supported at its upper end, as by a hinge fulcrum or bracket 19 bolted to one of the side channels 9 of the lower frame. At its lower end, the hinge pin 18 has a bearing in an angle 20, the lower end of which is bent and apertured to receive the hinge-pin 18, which is held against accidental withdrawal by cotter-pins 25, 25. The track extensions are formed in the shape of cantaliver brackets.

The track extensions are made of the same cross-sectional size as the main tracks and, when each track extension bracket, as a whole, is in extended position, each main track and its extension form one continuous arc of a circle. Carried by one end of each extension track is a hinge member 26. Secured to each of the track extensions 17, at an angle thereto, and substantially at the longitudinal center of the channel of said track, is a brace angle 27. Secured to each of the tracks 17 and the brace angle 27 is the vertically disposed brace stiffener 28 formed of an angle iron. The lower end of the brace angle 27 is bent, and is apertured to receive the hinge pin 18. As will be seen, the brace-angles 20 and 27 are complemental, and the bent ends thereof overlap the apertures through such ends registering.

It is immaterial how the track-extensions are hinged to the main tracks, and other means of hinging and bracing said track-extensions may be used, as is obvious.

To hold each of the track extensions in extended position, a brace 30 is pivoted, at one end, to said track-extension. The other end of the brace is adapted to be held, by a suitable pin, in either of two jaws or brackets 34, 34 carried by the sides of the lower frame. When the track extension is in folded position, the end of the brace 30 is held in that jaw 34 which is nearer the longitudinal center of the sides of the lower frame. Should it now be desired to make use of the track extension, the pin holding the end of brace 30 is removed, and the entire track extension is swung outward on its pivot. The end of the brace 30 will then be held in that jaw 34 which is farther from the longitudinal center of the side of the lower frame. In this position, the end of main track and of the corresponding track extensions abut, so as to form a continuous and uninterrupted track. It is readily seen, from the foregoing description, that a simple means is provided for increasing the range of work of the pile driver. The large radius upon which the rollers or wheels carried by the upper frame ride renders the structure very rigid, since the tracks afford two widely separated supports for the upper frame. There is, therefore, a minimum tendency for the entire upper frame to tilt relative to the lower. Since the positioning of the rollers or wheels 5 on which the upper frame moves is such that at least three out of five rollers on each end of the frame always rest on the lower frame, proper balancing of the upper frame is secured, as the center of gravity is always maintained over the lower frame.

If desired, a strut 191 may be secured to the outer end of each track-extension 17, said strut, at its free end, carrying a pulley 192, over which passes a cable 193 to a winding drum 194 carried by the lower frame, the other end of the cable being secured to the lead 86. The strut and cable tend to prevent the leads from swaying.

To rotate the upper frame relatively to the lower frame, a manually operated pinion and a rack is provided. Supported in suitable bearings at the longitudinal center of the front end channel 2 of the upper frame, is a rotatable pinion-shaft 36 keyed to which is a pinion 37. The pinion-shaft 36 is provided at one end, with a suitable crank or handle 38, by turning which the pinion 37 may be rotated. The pinion 37 meshes with a curvilinear rack 39, carried by the front track channel 10 of the lower frame. The rack is curvilinear in shape so as to conform to the contour of the track channel 10, the teeth of the rack being radially disposed about the axis of pivot pin 4 at the center of the pile driver.

The invention comprehends clamping means designed to hold the upper frame securely to the lower frame at any point to which the upper frame may be moved, and preventing possibility of overturning of the upper frame and the boom carried thereby, when the hammer is at work. An example of one form of such clamping means is disclosed in Figs. 20 and 21 of the drawings, and will now be described.

Carried at the rear end of the upper frame and equidistantly spaced on an arc having its center at the center of pivot pin 4, are rear frame clamps including clamp-dogs 41. To support these clamp-dogs 41, a longitudinally curvilinear channel 42, having its side flanges horizontally disposed, is provided.

The channel 42 is of the same cross-sectional size as the channels making up the four edges of the upper frame. This channel 42 also serves to support one set of the bearings 8 for the shafts 7 of rollers 5. Each clamp includes, also, a U-shaped clamp bracket 43. The legs of the clamp bracket are provided, at their ends, with outwardly turned feet 44 secured to the top flange of channel 42. Fitting within the bracket 43 is the U-shaped clamp support 45, the legs of which provide bearings for a pin 46 extending across the support and through said legs, the ends of said pin projecting into longitudinal grooves 47 on the inside of the legs of the bracket 43. The groove and pin construction permits vertical movement of the support 45 relative to the bracket 43, and prevents relative rotation thereof.

The bracket 43 is provided, at its upper end, with a clamp screw 48 in threaded engagement therewith. The head of the screw bears against the bridge portion 50 of the clamp support 45. At the upper end of the screw 48, a handle or crank 51 is provided, so that, when the handle 51 is turned, the screw is turned and the clamp-dog 41 correspondingly tightened or loosened. The pin 46 pivotally supports, between the legs of the U-shaped clamp support 45, the dependent clamp-dog 41. The jaw 52 of the clamp-dog is adapted to engage the under side of the upper flange of the rear track channel 10. To prevent sliding off of the jaw 52 from the flange, a clamp bearing 53 is secured to the lower surface of the upper flange of the track-channel 11, which clamp-bearing extends the full length of the track channel and the rear track extension 17. A marginal bead 54 on the clamp bearing 53 materially assists the action of the device by preventing horizontal movement of the jaw 52. A chain 55 secured to each of the clamp-dogs 41 is used to hold the clamp-dog in inoperative position, by hanging the end link of the chain on a hook 57, secured to the clamp bracket 43. When the chain is placed on the hook, the clamp-dog 41 is in an oblique position and away from the track channel 10. To tighten the clamp, it is merely necessary to release the chain from its hook, allow the clamp dog 41 to project under the flange of the track channel 11, and rotate the handle 51, thus causing a vertical upward movement of the clamp support 45, the pin 46, and the clamp-dog 41. Such upward vertical movement is continued until the clamp is securely tightened. It is thus seen that an efficient clamping means is provided, which enables one to set the clamp from the top of the pile driver and obviate the necessity for reaching below the lower frame.

The front frame clamps illustrated by Fig. 22 include the clamp-dogs 58 and are preferably, four in number, two of them being carried by the front end upper-frame channel 2. These two clamps are desirably those nearest the center line of the frame. The two outside clamps are preferably carried by end roller box channels 59 which also support the bearings 8 of the shafts 7 of the rollers 5. The disposition of said end channels 59 are such that, before the upper frame is moved, they are substantially parallel with the end portions of the front track channel 10 of the lower frame.

The front frame clamps each include a clamp bracket 60 fastened to the bottom flange of the channel 2 (or 59). Each clamp bracket has a pair of parallel ears 61 apertured to receive the pin 62, serving as a pivot for the dependent clamp-dog 58. Said clamp-dog is substantially L-shaped, and is provided at its upper end with a boss having a slot 63 through which the pin 62 extends. At the extremity of the horizontal portion of the dog is an enlarged boss 64 tapped to receive a clamp screw 65 provided with a head 66 adapted to be held in a screw nut 67. This nut is hexagonal in shape and is tapped at its upper end for the reception of a clamp seat 68, having a threaded stem 68'. When the clamp seat is screwed into the nut 67, the head 66 of the screw 65 is held against appreciable relative vertical movement with the nut 67. The clamp seat 68 has a head rectangular in form, and grooved as shown at 69 so as to fit the bottom flange of the front track channel 10. A handle 70 secured to the clamp screw at its end by a cotter pin 71, is used to rotate the screw 65, and thus securely press the clamp seat 68 against the bottom flange of the front track channel 10. A chain 72, secured to the clamp-dog, serves to hold said dog in inoperative position, by hooking the chain over a hook 73. Thus when the upper frame is to be rotated relative to the lower frame, the clamping dogs are held from interfering with said operation.

The use of the clamp is now apparent. Due to the peculiar construction of the clamp seat 68, the clamp can be used even though as in this case, the lower channel to be clamped is not in parallel relation with the upper channel. This use is further facilitated by the slot 63 for the reception of pin 62 in the clamp-dog 58, since limited horizontal adjustment is permitted thereby.

The clamps are not claimed herein since they form the subject-matter of a separate application, Serial No. 293,028, April 26, 1919.

As thus far described, it can be readily seen that the entire pile driver has a large radius of action. The upper frame carrying the boom and guides for the hammer, can be brought into position for driving piles, even though the piles may be displaced a considerable distance to the side of the pile driver. The large radius upon which the upper frame rollers ride, and the positive clamping means provided for the two frames, produce a strong and rigid structure, capable of withstanding any tendency of the upper frame to tilt relatively to the lower frame. And, by means of the pinion and rack at the front end of the frame, the time consumed in bringing the upper frame into position is reduced to a minimum.

The lower end of the boom 74 is pivoted to the rear end of the upper frame. The boom presents a trapezoidal outline, when viewed from above, and may desirably be formed of four angle irons 78 securely held together by appropriate lattice work 79 and brace angles 80. The boom carries, near its top, a sheave 81. Over this sheave passes a cable 83 for raising the hammer 84. At the extreme end of the boom, ears 85, 85 are provided and are appropriately apertured for the reception of the hanger 87 for the leads 86, 86, and said leads may be detachably connected to said hanger.

The leads 86, 86 for guiding the hammer 84, are formed as channels vertically disposed in parallel relation to each other and with the flanges turned outwardly and the leads are connected at their top by a channel 96, to which the connecting means between the boom and the leads may be secured, and which serves, also, to hold the leads in spaced relation so as to allow the hammer to slide there between. Auxiliary means for rigidly holding the leads in proper spaced relation may comprise angle irons 96' bent into U-shaped form so as to embrace both of the leads. The members 96' support at the bottom of the U, a ladder (more particularly hereinafter described.)

The leads near the upper end thereof, carry a pair of angles 98, serving to support a pair of wood buffers 99, and also further to stiffen the entire framework. The buffers 99 and angles 98 form a square opening when viewed from above, so as to permit the cable for hoisting the hammer, to pass. The buffers 99 are adapted to prevent the hammer being hoisted clear out of the leads. The advantages of this can be readily seen, since, should the hammer leave the leads, it would occasion appreciable damage. With my construction such an accident cannot occur, since the buffers act as stops for the hammer.

At the bottom of the legs of the U-shaped angles 96', the two side rails 100 for the ladder, are securely fastened. These rails extend from the bottom of the leads to the uppermost angle 96'. Connecting these side rails are rungs 101.

To prevent the leads swaying from side to side when the hammer is being operated, two pairs of sway braces 104, 104 (preferably of white oak) are employed. These sway braces may be pivoted at the base of the boom by fulcrum angles 105 riveted to the angles composing the frame of the boom. Beginning near the free end of each of the sway braces and continuing to well beyond the middle portion thereof, is the longitudinal slot 108 to accommodate a fastening bolt 109 carried by a bolt support 110 secured to the leads 86. The bolt support 110 has the offset bearing portion of bridge 112, through which the bolt 109 passes. The sway braces 104 are tightened by means of handle nuts 114. The location of the bolts 109 on the leads is such as to lend the maximum rigidity to the structure when the sway braces 104 are tightened. Thus, when the hammer is allowed to drop on the pile, the incident vibration and joltings are materially or practically nullified. Furthermore, when it is necessary to move the boom and leads over a pile to be driven, it is merely necessary to loosen the four handle nuts 114, and operate the hand winch for raising or lowering the boom.

The hammer 84 is guided in its vertical movement by the leads 86, 86, which fit into longitudinal grooves 115 in the sides of the hammer. The bottom of the hammer is bellied out to impart a substantially circular cross-sectional shape to it at the lower end. The hammer carries a pin 116, to which the hammer cables is attached.

117 is a follower having substantially the same outline as the hammer 84 and having grooves 118 similar to the grooves of the hammer. The follower is provided, on both ends, with frusto-conical depressions 119, whereby it may be properly adjusted to the head of a pile and when placed on top of a pile to be driven, it prevents the top being mushroomed.

At each side of the follower, a hook 120 is provided. These hooks are adapted to be engaged by the looped cables 121 carried by eye bolts 122 tapped into the hammer. The cables are used when it is necessary to lift the follower and place it upon another pile. When the cables are not in use they are hung out of place on the hooks 123 tapped into the hammer 84 near its upper end and provided with the spring guards 124. It is readily seen that, with this arrangement, a convenient means is provided for placing the follower wherever it may be needed, and the necessity for employing a sling is entirely obviated. When the cables 121 are hung on the hooks 123 they are out of the way of possible interference with the hammer when driving piles.

The hammer hoisting cable is guided by the boom-sheave 81 carried by the upper frame at the center of its rear end. The cable passes under sheave 125, and over a corresponding guide sheave 127 carried by the upper frame. After the cable leaves the guide sheave 127, it is wound around the drum 129 of the hoist, which is of conventional design, and is adapted to be driven by an engine 131 directly geared thereto. The control of the hoist is accomplished by means of the conventional foot pedal; and appropriate board flooring 132 is provided, on both sides of the hoist, for the operation.

When the pile driver is not in use, or when it is being transported, it is essential that the boom and braces be folded back toward the front of the pile driver. In this way also the vertical space occupied by the entire machine is materially reduced. To fold the structure, first the handle nuts 114, holding the braces 104 tightly, are loosened, and a hand boom elevating and lowering device 133, which may consist, essentially, of a nut and screw, is operated to lower the boom gradually into the position shown. Said elevating and lowering device is supported upon the bracket casting 29'. This casting is provided with an L-shaped portion 134 secured at the longitudinal center of a transverse angle iron of the upper frame.

Rotatably supported at their outer ends, in vertical plates 136, 136, carried by the side frame-channels 2 of the upper frame are two shafts 137, 137. Said shafts are supported at their inner ends, in ears 138, 138 carried by the casting 129'. Carried by the exterior ends of said shafts are cranks 139 by which the shafts may be rotated. Each of the shafts carries at its inner end a bevel pinion 140.

The two bevel pinions 140, 140 are oppositely arranged and mesh with a bevel gear 141, carried by the lower end of the screw 133. This screw has a shoulder 142 toward its lower end, against which may bear a collar or washer 143 on the screw 133. The screw 133 has a bearing in a yoke casting 142'. This yoke encircles the bevel gear 141. A nut 144, screwed in the threaded lower end of the screw 133, holds the gear 141 tight against the yoke 142.

The bracket 129' carries, also, two apertured ears 145, 145, between which projects the base of the yoke 142, a pivot-pin 146 passing through the apertures of said ears and through said yoke-base, and being held against accidental withdrawal by cotters 147, 147. It will be noticed by this construction that the yoke 142 and, consequently, the screw have a pivotal movement on the ears 145, 145.

The screw 133 works in and projects through a screw-block 146' provided with transverse bolt holes 147', 147' through which may pass bolts 148, 148 for securing said block to a yoke comprising, in this instance two longitudinally-bowed channel-bars 149, 149, arranged with their channels turned outward. The bolts project through the channel-bars and carry means for preventing accidental removal thereof which may be nuts. Desirably reinforcing-plates 149', 149' are disposed against the channel-bars 149, 149 between the flanges thereof, through which plates the bolts 148, 148 pass. Loss of the bolts when removed from their operative position is prevented by a chain 154 secured, at one end, to the head of the bolt and the other end to one of the channel-bars 149. Between the channel-bars 149, 149 and disposed transversely thereof are guides for the screw-block, comprising, preferably channel-bars 155, 155, appropriately secured to the channel-bars 149, 149, by angle-clips 156 riveted to said bars 155 and 149. When the bolts 148, 148 are removed, the screw-block may be removed by sliding the same along the guide channels 155, and said bolts may be placed in the holes 157, 157 in the bars 149, 149.

Carried by the ends of the bars 149, 149 are trunnions 158, 158 each comprising, in this instance a stem, of circular cross-section, carried by a plate 159 secured to the bars 149, 149.

The trunnions 158, 158, are swiveled in bearing-plates 150, 151, 152 carried by the boom.

In moving the boom from the position of operation (as shown in full lines in Fig. 1) to that of rest (as shown in dotted lines in Fig. 1), the boom is first raised, from the inclined position shown in Fig 1, by means of the boom-guide cable 160, and the hand-winch, until the boom is within reach of the elevating screw 133. Thereupon, the bolts 148, 148 are placed in the holes 147', 147' in the plates 149' and in the registering holes in the block 146'. The lowering of the boom is now accomplished by rotating the crank 139. When the boom has been lowered, the bolts 148, 148 securing the screw-block 146 in place are removed permitting the block to slide in the guides 155, 155, thus relieving the screw 133 and other parts of the weight of the boom, the weight of the latter being thereupon sustained by the cable 160 passing over a sheave 161 carried by a shackle 162 supported by ears 163, carried by the head of the boom. The cable 160 is wound around a drum 164 carried by the upper frame.

The drum is provided with a gear 165, meshing with a pinion 166 on a shaft 167 carrying a crank or handle 168, by which means the drum may be rotated to wind the cable 160 thereon.

Carried by the rear track is a hammer holder, for supporting the hammer while the machine is not in use, as when it is being transported from place to place. The hammer-holder may comprise side walls 169, 169, which may be channels as shown, to which are secured hinge-plates 170, 170 hinged at 171, 171 to hinge-brackets 172, 172 carried by the rear truck of the machine. The side rails 169, 169 carry a transverse removable top rod or bolt 170' and a transverse bottom support or seat for the hammer, comprising preferably, a channel 171'. Also carried by said side-rails 169, 169, beneath the channel 171', is a removable rod 172' projecting, at both ends, beyond said side-rails.

Suitable means may be provided for moving said hammer support, with the hammer carried thereby, from a vertical to a horizontal position, and preferably a cable 172$^a$, is utilized for this purpose which may pass over a suitable guide pulley to a winding drum on the machine.

For holding the hammer support, with the hammer carried thereby in horizontal position, suitable means are provided preferably hooks 173, 173 hinged or pivoted as at 174, to hinge-brackets 175, 175 carried by the rear truck.

Means are also provided for steadying the hammer while in its horizontal position, and such means preferably comprise spring-arms 176, 176 having curved terminals 177, 177, and formed of a single length of spring metal bent to form a bridge 178 connecting said arms 176, 176, at their top, said bridge being adapted to be secured to the rear truck, with said arms in a dependent position. As the hammer is swung upward, it is forced between said spring arms 176, 176, thus tending to steady the hammer against sidewise sway.

A brake-platform 179 is carried by the rear truck, upon which an operator stands.

Suitable means for supporting the loom and leads when the same are lowered or in reclining position, preparatory to transporting the machine are provided. In this instance such means include two legs 180, 180, (preferably two angle-irons) pivoted to the boom as at 182. When the boom is being lowered into an approximately horizontal position, the said legs swing into a vertical position, whereupon they are removably secured to the front end channel member of the upper frame in any suitable manner, as by bolts passing through the feet of said legs, and nuts screwed on the lower end of said bolts to clamp the bolts in position.

A seat 190 may be removably secured to said legs 180, 180 when the latter are in vertical position (as shown by dotted line in Fig. 1). This seat forms the subject-matter of a separate application for patent filed April 26, 1919, Serial Number, 293029.

The boom-supporting means also include vertical members 185, 185 (preferably of angle-iron construction) secured, at their lower end to the upper frame. Diagonal braces 186' are desirably secured to said members 185 and to the upper frame. Said members 185, 185 carry a horizontal beam 186, constituting a boom-rest. The beam 186 is desirably provided with fiber faces or cushions 187 against which the boom rests when in a recumbent position. These cushions prevent possible damage of the boom when brought into contact with the beam 186, and the cushions are easily replaced when worn. This boom-support 185 and 186 is arranged on the upper frame so as to support the boom at approximately the longitudinal center thereof.

Having thus fully described my invention, what I claim as new and desire to secure by Letters Patent, is:—

1. In a pile driving machine, an upper and a lower frame, pivoted together whereby the former may be moved relative to the latter, stationary tracks carried by the lower frame on which said upper frame moves, and auxiliary tracks hinged to said lower frame and movable into and out of alinement with said stationary tracks.

2. In a pile driving machine, an upper and a lower frame, pivoted together whereby the former may be moved relative to the latter, wheels carried by the upper frame, stationary tracks carried by the lower frame on which said wheels ride, and auxiliary tracks also carried by said lower frame and movable into and out of alinement with said stationary tracks to amplify the swivel movement of the upper frame.

3. In a pile driving machine, an upper and a lower frame, the former being movable relative to the latter, stationary tracks carried by the lower frame on which said upper frame moves, and auxiliary tracks hinged to said lower frame and lying, in the inoperative position thereof, against the sides of said frame, and movable to the inoperative position thereof, in alinement with said stationary tracks to amplify the swivel movement of the upper frame.

4. In a pile driving machine, an upper and a lower frame, the former carrying a boom and being movable relative to the lower frame, stationary tracks carried by the lower frame on which said upper frame moves, auxiliary tracks also carried by said lower frame and movable into and out of alinement with said stationary tracks, and means connected to said boom and lower frame for bracing said auxiliary tracks in said position of alinement.

5. In a pile driving machine, the combination, with a hammer, of a swinging carriage therefor movable from a vertical to a horizontal position, and spring means automatically engageable with the hammer when the carriage is swung into a horizontal position, said spring means operating to prevent side-wise movement of the hammer.

6. In a pile driving machine, the combination, with a hammer, of a swinging carriage therefor movable from a vertical to a horizontal position, and a bowed leaf spring, the terminals of which engage said hammer when the carriage is swung to a horizontal position, said spring operating to prevent side-wise movement of the hammer.

7. In a pile driving machine, the combination, with a hammer, of a swinging carriage therefor movable from a vertical to a horizontal position, and a leaf spring being provided with a base portion attachable to the machine and with diverging arms having grooved terminals engageable with the hammer when the carriage is swung to the horizontal position.

8. In a pile driving machine, the combination, with a hammer having longitudinally extending grooves, of a swinging carriage for said hammer comprising channel-bars disposed in the grooves of the hammer, and means automatically engageable with the hammer when the carriage is moved from a vertical to a horizontal position, for preventing side-wise movement of the hammer.

9. In a pile-driving machine, the combination, with a pivoted boom, of means for raising and lowering said boom, including a screw, a block having a threaded screw-opening therethrough, in which said screw is threaded, guides in which said block slides and to which it may be secured against such sliding movement, and a carriage for said guides pivoted to the boom.

10. In a pile-driving machine, the combination, with a pivoted boom of means for raising and lowering said boom, including a screw, a block having a threaded screw-opening therethrough, in which said screw is threaded channel-guides in which said block slides and to which it may be secured against such sliding movement and supporting means for said channel-guides pivoted to said boom.

ALEXANDER M. BELLONY.